July 5, 1966  D. WIEBE ETAL  3,258,895
DEVICE FOR SEPARATING SOLIDS FROM A GASEOUS MEDIUM
Filed Oct. 19, 1962  6 Sheets-Sheet 1

INVENTORS.
DONALD WIEBE
ARTHUR L. BARRETT
BY
ATTORNEY

July 5, 1966   D. WIEBE ETAL   3,258,895
DEVICE FOR SEPARATING SOLIDS FROM A GASEOUS MEDIUM
Filed Oct. 19, 1962   6 Sheets-Sheet 2

INVENTORS.
DONALD WIEBE
ARTHUR L. BARRETT
BY
*E. Wallace Barrett*
ATTORNEY

INVENTORS.
DONALD WIEBE
ARTHUR L. BARRETT
ATTORNEY

July 5, 1966 D. WIEBE ETAL 3,258,895
DEVICE FOR SEPARATING SOLIDS FROM A GASEOUS MEDIUM
Filed Oct. 19, 1962 6 Sheets-Sheet 4

INVENTORS:
DONALD WIEBE
ARTHUR L. BARRETT
BY
ATTORNEY

July 5, 1966 D. WIEBE ETAL 3,258,895
DEVICE FOR SEPARATING SOLIDS FROM A GASEOUS MEDIUM
Filed Oct. 19, 1962 6 Sheets-Sheet 6

INVENTORS:
DONALD WIEBE
ARTHUR L. BARRETT
BY *E. Wallace Breust*
ATTORNEY

United States Patent Office 3,258,895
Patented July 5, 1966

1

3,258,895
DEVICE FOR SEPARATING SOLIDS FROM A GASEOUS MEDIUM
Donald Wiebe, Greensburg, and Arthur L. Barrett, Franklin, Pa., assignors to Joy Manufacturing Company, a corporation of Pennsylvania
Filed Oct. 19, 1962, Ser. No. 233,997
7 Claims. (Cl. 55—1)

This application is a continuation-in-part of application Serial No. 820,557, filed June 15, 1959, now abandoned, for Separating Device which is a continuation-in-part of application Serial No. 693,757, filed October 31, 1957, for Separating Device, now abandoned.

This invention relates to a separating device and more particularly to an improved device wherein one or more gases are brought into contact with a liquid, and thereafter the liquid and any gases not dissolved in the liquid are separated, or to an improved device for separating solids such as dust or dirt from an air or other gaseous medium.

In general there are various commercial separating devices of either the wet or dry type for separating foreign material from a flowing gas stream. Many of such devices are extremely cumbersome in order to obtain sufficient removal of the impurities. Still other devices are totally incapable of removing a sufficiently high percentage of impurities so that their exhaust still contains a high percentage of fine impurities.

Thus, one object of this invention is to provide a new and improved separating device having a novel stationary member for obtaining separation of matter flowing in a fluid stream.

Another object of this invention is to provide a new and improved separating device having a stationary frusto-conical member for obtaining improved removal of a substance from a flowing fluid stream.

Still another object of this invention is to provide a new and improved separating device having a hollow outwardly flared member for obtaining improved removal of a substance from a flowing fluid stream.

Yet another specific object of this invention is to provide a new and improved separating device having a hollow stationary frusto-conical member for obtaining improved removal of a substance from a flowing fluid stream.

A further object of this invention is to provide a new and improved separating device having a plurality of spaced hollow stationary members for obtaining improved removal of a substance from a flowing fluid stream.

Still another object of this invention is to provide a new and improved separating device having a stationary outwardly flared member for obtaining improved removal of a substance from a flowing fluid stream and another inwardly flared member for directing the fluid flow after the first flared member.

These and other objects of this invention will become more apparent when taken in conjunction with the following detailed description of preferred embodiments thereof and the following drawings in which:

FIGURE 3 is a graphic representation of the axial and vortex velocities on plane A—A of the device as shown in FIGURE 1a,

2

Figure 1A:
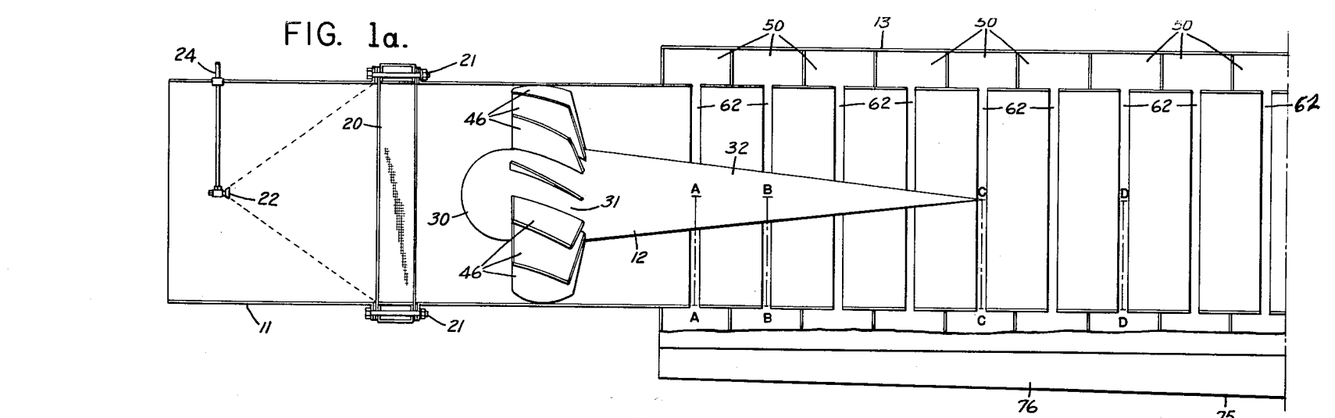
FIGURES 1a and 1b are longitudinal sections of a separating device constructed in accordance with the principles of this invention taken about a center plane thereof with portions of the device being shown in side elevation.
Figure 1B:
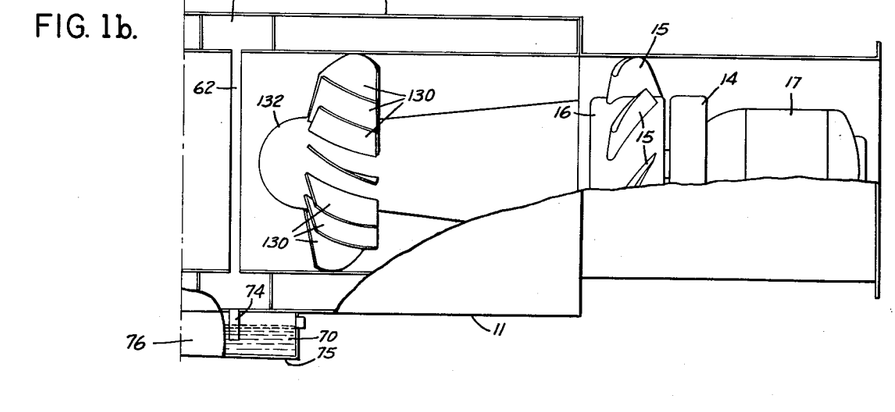

Referring to the embodiment of this invention shown in FIGURES 1a and 1b, the reactor and/or separator is generally cylindrical in configuration and comprises an elongated tubular shell 11, an elongated conical inner core 12, and a cylindrical liquid collecting section 13 encompassing a portion of the shell 11 intermediate the ends of the collector. Air or other gaseous medium is drawn into the upstream or left end of the shell 11 of the separator or collector, as viewed in FIGURE 1a and is moved through the shell 11 of the separator by means of a fan 14 mounted in the downstream or discharge end thereof. The fan 14 may be of a conventional type, with a plurality of circumferentially spaced blades 15, the radially outer surfaces of which lie in close proximity to the outer shell 11 of the separator, mounted on a hub 16 which is driven by a suitable motor 17. As will become obvious from the description herein, the separating device is operative both as a horizontal and as a vertical separator, however, present reference will be made to a separator which is operating in a generally horizontal position. It will be appreciated by those skilled in the art that separating devices of this type have application in various sizes and for various capacities and that the dimensions used in the following description are merely for purposes of illustration. It has been found that a tube which is approximately 17½ inches in diameter, i.e., the inner diameter of the shell 11 is approximately 17½ inches, with a resulting cross sectional area within shell 11 of approximately 1⅔ sq. feet is adequate in cross sectional area. It will be appreciated that the fan 14 can vary in size depending upon the desired capacity of the unit and the velocity of flow therethrough.

The air of gaseous medium is pulled into the separator at a velocity of 3,000 or more feet per minute and first passes through a mixing screen 20 downstream of the entrance end of the shell 11. The screen 20 is removable within the shell 11 to extend thereacross substantially normal to the flow of air in any suitable manner, such as by means of threaded elements 21 passing through the screen frame and annular flanges extending radially outwardly from sections of shell 11 on either side of the screen 20. In the screen area the dust laden air is brought into contact with a liquid such as water which is sprayed, from a suitable spray nozzle 22 at a point upstream of the screen 20, downstream toward the screen 20. It will be understood that the spray can be directed at an angle away from the screen 20 so that the air carries the liquid droplets into the screen 20. A nozzle 22 is substantially centrally located, i.e. substantially aligned with the central longitudinal axis of the separator and is secured at the lower end of a pipe or suitable conduit 24 through which water is conducted under pressure from a suitable supply source, not shown.

For the purposes of this invention various screen structures 20 may be employed; however, we have found that a complete mixing of the dust particles with the water droplets is obtained by employing a screen 20 of a construction as is fully shown, described and claimed in Serial No. 571,795, filed March 15, 1956 by A. L. Barrett et al. for Gas and Liquid Contact Method and Apparatus, and which application has been assigned to the same assignee as this invention. It will be appreciated that if too little water is sprayed into the screen unit, an incomplete wetting of the dust particles by the water will result but that the ability of the dust particles to mix with the water will not decrease if surplus amounts of water are sprayed into the unit. However, obviously, due to economic considerations, both as to the cost of the water which is used and the cost of handling such water, and due to the additional power required to pull the surplus water through the unit, it is desirable that only enough water be sprayed into the screen unit so that substantially all of the dust particles are wetted by the water.

The wetted air and particle mixture flows downstream from the screen 20 and then passes into the annular space provided between the inner core 12 and shell 11. The inner core 12 is stationarily secured within and in spaced relation to the shell 11 by means of a series of vanes 46 which will hereinafter be described. As shown, the core 12 comprises a suitably rounded upstream extending nose portion 30 the downstream base of which is joined to the upstream end of a cylindrical blade receiving portion 31, the downstream end of which is joined to the upstream base of an elongated conical portion 32 which is located downstream from the nose portion 30. Although the portions 30, 31 and 32 may be fabricated in various manners as either a multiple or single piece structure, they are preferably formed from formed sheet metal with the longitudinal axis of the cylindrical portion 31, the longitudinal axis of the conical portion 32 and the central radius of the nose portion 30 being located substantially centrally of the shell 11 and in longitudinal alignment with each other. As is well known the reduced area resulting from placing the core 12 within the shell 11 produces an increase in velocity of the air and where the velocity of the entering air is about 3,000 ft. per minute, such decreased area through which it flows increases its velocity to about 4,600 ft. per minute.

The vanes 46 aforedescribed are secured to the cylindrical portion 31 and to the shell 11 in any suitable manner such as by welding and are located to impart a twist to the air stream passing therearound. The vanes 46 may be placed at different angles with respect to the horizontal axis of the separator, but are preferably equiangular at all points intermediate the inner core 12 and outer shell 11 to as to turn the air stream at an angle of about 45° from the longitudinal axis of the separator. The wetted air stream thus leaves the twist imparting vanes 46 with a tangential velocity as well as an axial velocity. It will be recognized that due to the vortical action of the air, the dust laden water particles are thrown to the outside of the annular space between the inner core 12 and the shell 11 and that due to the increased velocity over that at which the air enters the separator, the water particles will be thrown to the outside at a greater rate and over a shorter length of the separator than if the water separation were effected at the same velocity as that at which the air entered.

For the purpose of collecting the dust laden water which is so moved to the periphery of shell 11, the annular collecting section 13 is formed with a series of adjacent, longitudinally extending annular collecting spaces 50 each of which may be formed in any suitable manner, such as described in the above identified copending application. Each of the collecting spaces 50 is formed so that no air leakage will occur between adjacent spaces 50 which purpose may be accomplished in any suitable manner such as by welding all the joints of each portion of the collecting spaces 50 with the structural member adjacent thereto. As will be apparent the sealed collecting spaces 50 may be longitudinally spaced from each other, if desired. In order to permit entry of the dust laden water to the collecting spaces 50 the shell 11 is provided with circumferential openings 62 approximately centrally of the collecting spaces 50, respectively. If desired, in order to facilitate formation of the shell 11 the openings 62 need not be formed so as to be circumferentially continuous, however in order to collect a large amount of water the openings 62 are preferably substantially circumferentially continuous. By providing openings 62 the water laden air enters the collecting spaces 50 where due to the velocity of the air the water runs downwardly around the outer periphery of shell 11 within each of the spaces 50 and then through suitable elongated drain conduits 74 which extend outwardly from the lower portion of the collecting spaces 50, respectively. For a more complete description of such a water removal process the above identified application should be referred to. Each of the drain conduits 74 is connected to a suitable elongated sump 76 in which a water level is maintained to provide a satisfactory water seal between the conduits 74 and the outer atmospheric air. If desired, the sump 76 may be provided with an inclined bottom 75 whereby the dirt which settles out of the collected dust laden water will tend to accumulate at one end of the sump 76 in a manner as is well known in the art.

After such removal of water from the air stream the air stream then passes through a series of straightening vanes 130 which are mounted in circumferential spaced relation within the shell 11 as more fully described in the above identified copending application. As shown, the inner ends of the vanes 130 are secured to the upstream end of a suitable elongated support 132 which is of increasing size as it extends downstream to facilitate the flow of air therearound. The straightening vanes 130 remove the tangential component of the velocity of the air so that the exiting air flows with an axial velocity downstream from that point. The fan 14 and associated structure, as heretofore described, is located downstream from the straightening vanes 130 so that the air is drawn into the fan 14 and the blades 15 thereof adjacent the end of the core 12. The fan 14 thus moves the air outwardly through the downstream end of the shell 11 which surrounds the fan motor 17 to the atmosphere. It will be recognized that if desired the straightening vanes 130 can be eliminated and the air flowing in a vortical path brought directly into fan 14 in which event the blades 15 are designed to handle the air flowing in such a path in a manner as is well known in the art.

In general, with a wet type dust separator having an air stream flowing around a core water droplets collect on the outer surface of the core to form a boundary layer of water therearound which is carried downstream along the surface thereof, and subsequently reentrained in the air stream and carried out to the atmosphere. Although the amount of water which collects on the inner cores is small by comparison to the amount of water introduced into the unit, its removal is important in order to obtain a dry air discharge. Accordingly, this invention provides a particular core structure to eliminate such reentrainment of water.

As has been previously indicated, the air stream leaving the vanes 46 has both an axial and tangential velocity whereby the air stream downstream thereof follows a generally helical path along the shell 11. As is well known the total pressure head of a flowing air stream comprises the sum of the velocity pressure head and the static pressure head. Although it is realized that the friction of the air stream within the shell 11 reduces the total pressure head, such decrease is quite small so that it may be generally stated that the total pressure head of a gaseous stream flowing through the shell 11 between the vanes 46 and 130 remains substantially constant. As is well known, as the cross sectional area of an air stream increases its velocity pressure head decreases. Thus, with reference to the structure of FIG. 1a, it will be obvious that after the air stream leaves he vanes 46 the velocity pressure head will gradually decrease along the length of the conical portion 32 due to the gradually decreasing area within the shell 11 which is occupied by the conical portion 32. Such decrease in velocity pressure head is accompanied by a corresponding increase in the static pressure head in view of their constant sum relationship. It will also be realized that such decrease in velocity pressure head affects the axial velocity of the air stream and does not affect to any substantial degree the vortical swirl of circumferential velocity of the air stream, however, the number of revolutions of the air stream about the conical portion 32 per unit of length of the conical portion 32 will necessarily increase.

As is well known to those skilled in the art of aerodynamics, an axially flowing gas stream is compressed when passing around a blunt body, such as the nose portion 30 of the core 12 in the instant case, and begins to expand on the upstream portion of the conical portion 32 of core 12 resulting in a decrease in velocity and an increase in pressure in the direction of flow. The kinetic energy of the particles in the boundary layer adjacent the surface of the upstream portion of conical portion 32 of the core 12 is reduced because the particles are slowed down by the increase in the cross sectional flow area, the pressure gradient and the friction of these particles on the surface of conical portion 32 and eventually these particles come to rest. If the gas stream is permitted to expand a sufficient amount in a given length, the particles in the boundary layer after coming to rest are subjected to the pressure gradient in the flow around the conical portion 32 and the pressure acts on the particles inducing turbulence in the flow of these particles in an upstream direction. In an article by A. L. Barrett (a co-inventor in the instant application), published in the November 1935 issue of "Coal Age" it was pointed out that as a gaseous stream expands behind a blunt object the areodynamic downstream flow profile with its boundary layer at rest has an expansion angle of about 7° before such turbulence and reverse flow of the boundary layer occurs. In the past the practice in aerodynamic design has been to "streamline" the downstream portion of such blunt objects by providing a tapered or streamlined core, i.e., a core having a taper coinciding with the aerodynamic donwstream flow profile namely one which restrains the gaseous stream from expanding more than 7° with respect to a straight axial flow. Applicants have however provided a core which tapers inwardly of such an aerodynamic downstream flow profile and which permits the gas expansion angle of more than 7° with respect to the straight axial flow. Accordingly applicants' core permits turbulence of the gas stream and reverse flow adjacent the core surface.

FIGS. 3, 4, 5 and 6 show the axial velocity and the circumferential velocity of vortical swirl of the air stream about the conical portion 32 in the shell 11 on the longitudinal spaced planes A—A, B—B, C—C and D—D, respectively, of FIG. 1a. The velocity representation of FIGS. 3, 4, 5 and 6 are the result of experimental measurements and, accordingly, are true representations; however, due to the variations which normally occur in obtaining test results, the velocity diagrams of FIGS. 3 to 6 can not be considered as exact velocity representations. Each of these velocity representations illustrate the effect of the frictional drag of the surfaces over which the air stream flows.

Figure 3:
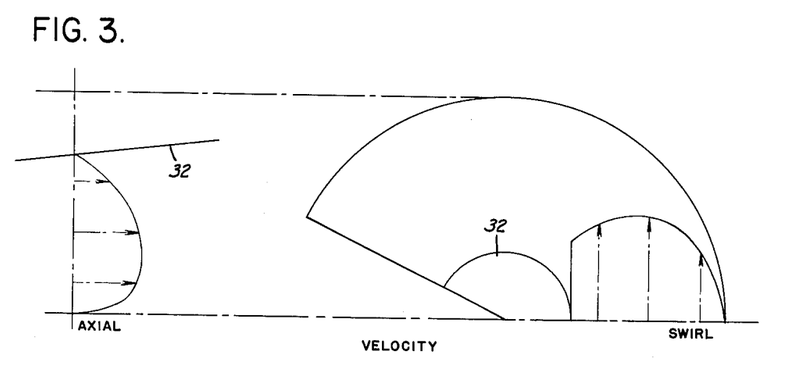

As the air stream flows longitudinally along the shell 11, the greater part of the water carried in the air stream is thrown outwardly against the inner surface of the shell 11; however, an accumulation of water also occurs on the outer surface of the core 12 downstream of the turning vanes 46. Such accumulation of water on the core 12 produces a boundary layer of water on the outer surface of the core 12 which has an initial downstream velocity whereby the boundary layer moves downstream of the shell 11 along the outer surface of the conical portion 32. FIG. 3 illustrates the fact that on plane A—A such boundary layer of water has an axially downstream velocity whereby the boundary water continues to move downstream along the outer surface of the conical portion 32 and a circumferential velocity whereby the boundary layer of water rotates about the outer surface of the conical portion 32. As the boundary layer of water so progresses downstream from plane A—A it steadily encounters the aforedescribed increasing static pressure so that the downstream velocity of the water steadily decreases until it is entirely dissipated. Thus, the kinetic energy of the boundary layer of water moving downstream on the outer surface of the conical portion 32 is steadily dissipated. It is one of the purposes of our invention to provide the conical portion 32 with a sufficient taper whereby the axial velocity and consequently the kinetic energy of the boundary layer of water is entirely dissipated before the apex of the conical portion is reached by the boundary layer of water. Once such energy or velocity is entirely dissipated the boundary water cannot flow any further downstream.

Figure 4:
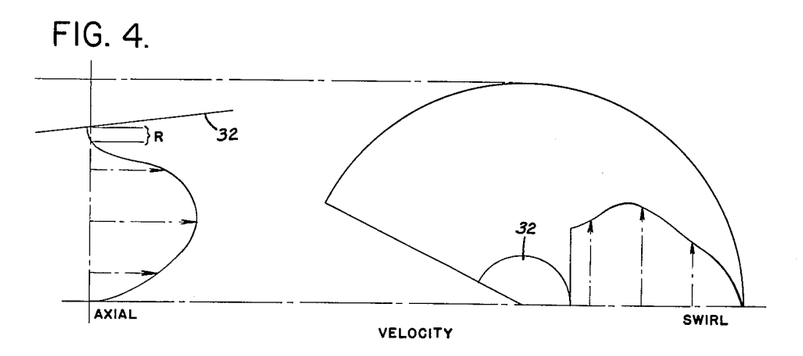
FIGURE 4 is a graphic representation of the axial and vortex velocities on plane B—B of the device as shown in FIGURE 1a, FIGURE 5 is a graphic representation of the axial and vortex velocities on plane C—C of the device as shown in FIGURE 1a, FIGURE 6 is a graphic representation of the axial and vortex velocities on plane D—D of the device as shown in FIGURE 1a, FIGURES 7a and 7b are longitudinal sections of another separating device constructed in accordance with the principles of this invention taken about a center plane thereof with portions of the device being shown in side elevation.

As is well known when a body is suspended within an air stream the flowing of air therearound creates a wake or vortex trail which extends downstream from the suspended body and which is composed of randomly directed eddying currents. It is another purpose of this invention to provide the conical portion 32 with a sufficient taper whereby the formed wake flows upstream with respect to the shell 11. Referring to FIG. 4 it will be noted that with the illustrated taper of the conical portion 32, at plane B—B the axial velocity of the air stream is downstream from the inner surface of the shell 11 to a point R spaced radially outward of the conical portion 32. At point R the axial velocity of the air stream is entirely dissipated. Of greater importance for the purposes of this invention is the fact that the axial velocity from point R to the outer surface of the conical portion 32 has been reversed so that the flow of air immediately adjacent the conical portion 32 on plane B—B is upstream. Thus it will be realized that the air stream flowing around the conical portion 32 has separated from the surface of the conical portion 32 to produce a wake having an axial upstream velocity. In view of the fact that the axial velocity is zero at a radial distance from the surface of the conical portion 32, it will be obvious that the air stream separation has occurred upstream from plane B—B. In view of the short radial distance to the point R it will also be obvious that such separation has occurred fairly close to plane B—B.

Figure 5:
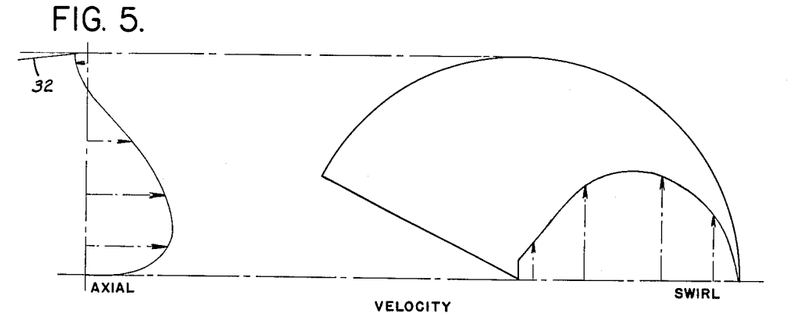
Figure 6:
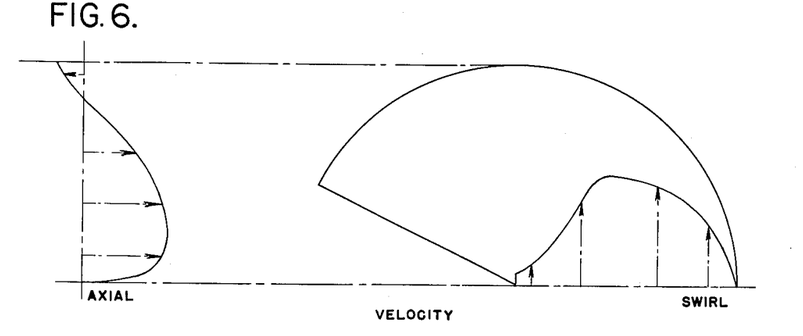

Referring to FIGURES 5 and 6 it will be noted that the aforedescribed wake continues to have a reversed axial velocity adjacent the outer surface of and downstream of the conical portion 32. These velocity representations are merely illustrative of the wake pattern and if desired, the continuity of the wake pattern can be illustrated by velocity diagrams taken on a number of closely located longitudinally displaced planes. It is believed that the particular velocity representations are sufficient to illustrate that the wake pattern does exist adjacent the entire outer surface of the conical portion 32 from the point the air stream separation occurs to the apex thereof. In addition it will be noted that the zero axial velocity points of FIGURES 5 and 6 are spaced substantially the same radial distance outwardly from the center line of the shell 11 to indicate that the wake pattern is cylindrical and extends downstream centrally of the shell 11 behind the conical portion 32.

In view of the abovedescribed wake, it will be obvious that the boundary layer of water travelling downstream on the outer surface of the conical portion 32 first loses all its kinetic energy and then is directed upstream along the outer surface of the conical portion 32 until it reaches the point of such air stream separation. As the boundary water is collected at this separation point it will accumulate to such an extent that it will be reentrained into the air stream around the wake and thereafter collected by means of the collecting spaces 50 heretofore described.

In order to accomplish the purposes of this invention it is necessary that the conical portion 32 be provided with a downstream taper such that the abovedescribed wake having an axial velocity reversal is obtained. In addition, in order to obtain a separating device of sufficient capacity it is desirable that the air flow through the shell 11 be turbulent and, accordingly, the taper for the conical portion 32 is selected with reference to such turbulent flow of air. If desired, however, a conical portion 32 may be selected for laminar air flow through the shell 11. Also as can readily be appreciated due to the similar flow characteristics of a gas or liquid the conical portion 32 may be selected for either laminar or turbulent flow of various desired liquids and gases. Regardless of what substance flows through the shell 11 or the type of flow therethrough, the criterion for the determination of the taper is one that is sufficient to cause separation of the flowing stream from the outer surface of the tapered portion 32 intermediate its end and which creates an upstream velocity adjacent the outer surface of the conical portion 32 downstream from such separation plane. For the purposes of this invention a 12° expansion angle for the air and water mixture described herein has been found to give excellent results. Angles larger than that have also been found to be satisfactory; however, too large of an expansion angle has been found not to be desirable due to the creation of excessive turbulence and resultant pressure drop. It is to be realized that the particular angle selected is so related to the substance flowing through the shell 11 and the type of flow therethrough that no general range satisfactory for all conditions and substances can be specified. Further, a base angle or the degree of taper for the conical portion 32 could be specified equally as well as the expansion angle.

Figure 2:
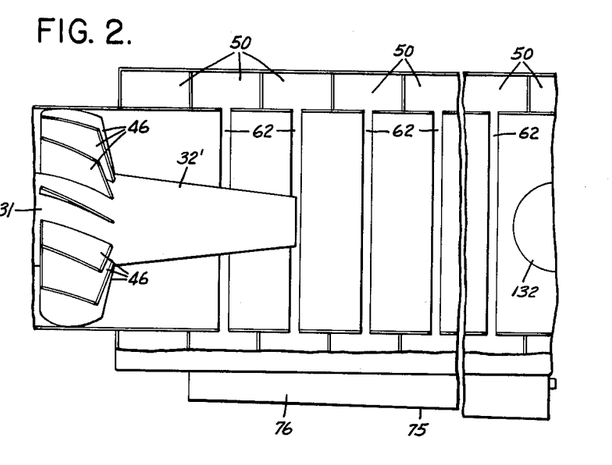
FIGURE 2 is a longitudinal cross sectional view of a portion of another separating device constructed in accordance with the principles of this invention with portions thereof being shown in elevation.

From the above description it will be obvious that once such axial velocity reversal has occurred it is not essential that the remaining downstream portion of the conical portion 32 be provided. Thus referring to FIG. 2 it will be noted that the structure of this invention may be modified by providing a frusto-conical section 32′ in which the tail of the conical portion 32, previously described, has been removed downstream from the separation plane. It is preferable that the conical portion 32′ has its downstream end located on a plane downstream from the plane upon which such axial velocity reversal normally initially occurs as changes in the velocity of the air stream will cause longitudinal shifting of the separation plane. Thus, as shown, the conical tail has been removed on the plane B—B, which as previously indicated is downstream from the plane upon which axial velocity reversal has initially occurred. With such a frusto-conical section the boundary water will flow upstream around the outer surface from the downstream end to the separation plane in the same manner as heretofore described. It can readily be appreciated that the velocity diagrams of the air stream from the vanes 46 to the plane B—B will be identical in this modification as those previously described with reference to the embodiment shown in FIGS. 1a and 1b. In view of the elimination of the conical tail the velocity diagrams of the air stream are not identical on the plane C—C as those shown with reference to the previously described embodiment. It is believed obvious, however, that such wake pattern will be substantially identical downstream of the core regardless of which modification of this invention is employed. As all other components shown in FIG. 2 are identical to those previously described such components have been identified with the same reference numerals. Further as only the structure of the conical portion 32′ differs from the structure shown in FIGS. 1a and 1b only such portion of this modification has been illustrated.

Figure 7A:
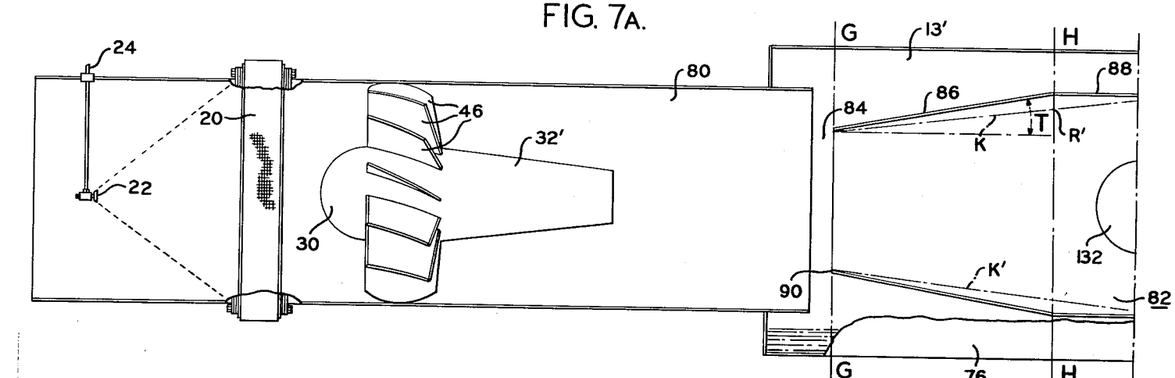
Figure 7B:
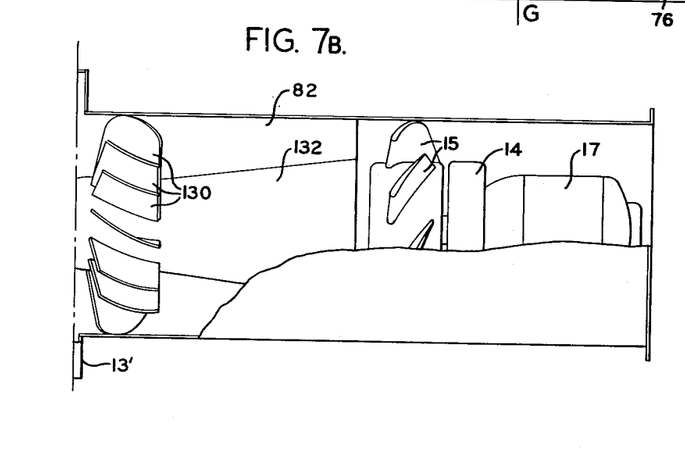

Although the novel structure heretofore described has related only to the core 12 and the structure cooperable therewith, the principles of this invention are equally applicable to a structure for collecting dust laden water downstream of a core. FIGS. 7a and 7b illustrate another embodiment of the invention in which like parts have been identified by the same reference numerals. In the structure heretofore described the boundary water on the core 12 is reentrained in the air stream and is collected downstream of the core 12 by passing through the openings 62 in the shell 11. In this embodiment of the invention the collecting spaces 50 and openings 62 are eliminated and a collecting section 13′ is provided, which is similar to the collecting section 13. The important structural change over that previously described is that a pair of axially aligned elongated tubular shells 80 and 82 are provided which are axially spaced from each other to provide a circumferential gap 84 therebetween. As shown the shell 80 is located upstream from the shell 82 and corresponds to the upstream portion of the shell 11 which supports the screen 20, nozzle 22, core 12 and vanes 46 as previously described. The downstream end of the shell 80 extends into the upstream portion of the collecting section 13′ and is suitably secured thereto to prevent air leakage therebetween.

The upstream end of the downstream shell 82 is provided with an axially extending tapered portion 86 which has an upstream diameter less than that of the shell 80 and which flares outwardly at an angle with its downstream end terminating into a circular elongated portion 88 which is of the same diameter as the diameter of the shell 80. The portion 88 of the shell 82 corresponds to the downstream end of the shell 11 to receive a support 132, vanes 130, fan 14 and motor 17 as previously described. In order to accomplish the purposes of this invention the portion 86 of the shell 82 is provided with a suitable taper so that as it increases in diameter as it progresses downstream the air stream will have an upstream velocity component adjacent the inner surface of the portion 86. As will become apparent, the portion 86 may be provided with various suitable tapers and, as shown, the portion 86 is preferably frusto-conical in form with the large diameter end being located downstream.

In view of the identical structure of the upstream portion of the shell 11 and the shell 80, the air stream with dust and water entrained therein has both an axial and tangential velocity at the downstream end of the shell 80 with the greater portion of the dust-water mixture being located on the inner surface of the shell 80. Accordingly, the greater portion of such mixture is axially discharged from the downstream end of the shell 80 above the outer surface of the tapered portion 86 of the shell 82 into the chamber 13′. The greater portion of the air stream flows into the circular mouth 90 at the upstream end of the shell 82 and axially through the shell 82. Although the greater portion of the dust-water mixture flows directly into the chamber 13′ the medium flowing through the shell 82 has, in some instances, some dust-water mixture therein which must be removed in order to obtain a dry air discharge from the shell 82. The removal of this remaining dust-water mixture in the air stream is obtained by the tapered portion 86.

Figure 13:
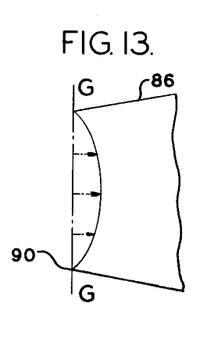
FIGURES 13 and 14 are axial velocity diagrams of the fluid flow through the device as shown in FIGURES 7a and 7b taken along the lines G—G, and H—H, respectively.

It will be realized that as the air-dust-water mixture enters the mouth 90 that such mixture also has both an axial and tangential velocity. In view of the radial outward taper of the portion 86 the cross sectional area of the flow path in the portion 86 is increased down stream of the mouth 90 so that the velocity pressure head decreases and the static pressure head increases, due to the relationship heretofore set forth. As before, such decrease in velocity pressure head does not affect, to any substantial degree, the vortical swirl of the air stream; however, the number of revolutions of the air stream per unit of length of the tapered portion 86 will increase. Accordingly, the dust-water mixture still remaining in the air stream is, due to its greater weight, thrown outwardly against the inner surface of the tapered portion 86. FIG. 13 is an approximate illustration that at each point across the mouth 90 the axial velocity of the air stream is downstream. As soon as the air stream passes downstream from the mouth 90 the increased cross section of the flow path due to the portion 86 permits the kinetic energy of the air stream to be converted to static pressure so that the air stream expands. Thus, the air stream becomes progressively larger as the air stream progresses downstream, however, the air stream can only be expanded at a certain rate without obtaining turbulence around the outer surface of the air stream. Expansion of the air stream at a greater rate than that whereby non-turbulent flow is obtained results in a turbulent flow which produces eddy currents at the outer surface of the air stream. It is the purpose of this invention to obtain a controlled turbulent expansion of the air stream so that the eddy currents at the outer surface of the air stream have an upstream velocity.

Figure 14:
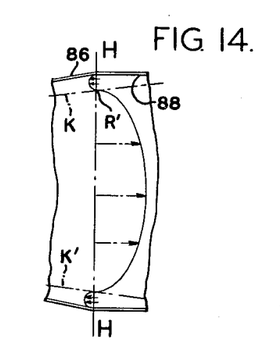

FIG. 14 illustrates the axial velocity of the air stream at the juncture of the tapered portion 86 with the tubular portion 88. As shown, the axial velocity of the air stream closely adjacent the inner surface of the portion 86 is upstream while the axial velocity between such upstream portion is downstream. Point R' indicates the point of zero axial velocity between the upstream and downstream velocity portions of the air stream. Although, not shown, velocity diagrams, if taken axially downstream from the mouth 90, would show that such turbulent expansion of the air stream produces an upstream velocity component along the entire inner surface of the portion 86. Since an upstream velocity is created adjacent the inner surface of the portion 86 each longitudinal section of the portion 86 will have a point, such as point R', of zero axial velocity. A plot of such zero velocity points for their entire length produces, in cross section, an upper and lower outwardly tapered line inwardly adjacent the upper and lower inner surfaces of the portion 86. Such upper and lower zero velocity lines have been shown by the construction lines K and K' respectively and it will be noted that they extend outwardly from the mouth 90 at a smaller angle to the horizontal than the side of the portion 86 extends. Since the zero velocity line is adjacent the entire inner surface of the portion 86, the geometric form of the plane of zero axial velocity is similarly frusto-conical. Thus, an annular frusto-conical section is provided between the plane of zero axial velocity and the inner surface of the portion 86 in which the axial velocity is upstream. The axial velocity of the air stream in the frusto-conical volume encircled by the plane of zero axial velocity is downstream.

By providing such an upstream axial velocity section the dust-water mixture accumulated on the inner surface of the portion 86 is forced to flow upstream to the mouth 90. Such upstream dust-water mixture flow will continue until the dust-water mixture accumulates immediately downstream of the mouth 90 to a sufficient degree so that it is forced outwardly upstream of the mouth 90 into the chamber 13'. Referring to FIG. 13 it will be noted that the axial velocity of the air stream at the edges of the mouth 90 is substantially zero so that a small accumulation of water downstream thereof readily exerts a sufficient gravitational force to flow upstream of the mouth 90. The water accumulated in the chamber 13' is removed therefrom in any suitable manner such as by a sump 76 as previously described.

It will be realized that the plane of zero velocity substantially represents the outer periphery of a non-turbulent expansion so that the intersection of the plane of zero axial velocity with the inner surface of the downstream portion 88 determines the point at which upstream velocity component is eliminated. Thus, for the entire length of the plane of zero velocity certain portions of the velocity pressure head of the air stream is constantly being dissipated. In actual practice, the annular turbulent flow section need not be as large as shown in FIG. 7a as the dust-water mixture is quickly accumulated along the inner surface of the portion 86 in an area considerably upstream of the portion 88. Accordingly, the length of the tapered portion 86 may be substantially reduced from that heretobefore described. FIGURES 8 to 12 illustrate various modifications which may be made in the dust-water mixture eliminator structure of the invention as shown in FIG. 7a which will readily accomplish the same purpose. Accordingly, only the central portion of such modification of the separator has been shown in FIGURES 8–12 and like parts have been identified by the same reference numerals.

Figure 8:
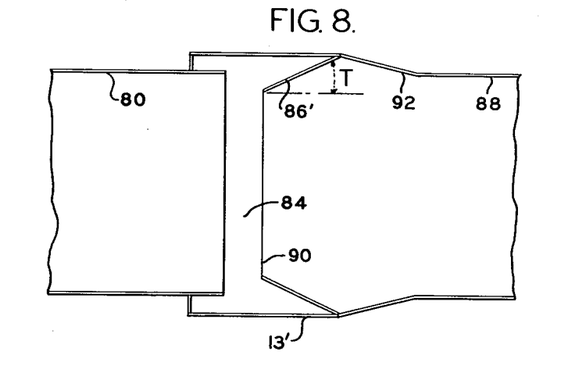
FIGURES 8, 9, 10, 11 and 12 are longitudinal sections of portions of modifications of the invention as shown in FIGURES 7a and 7b, respectively.

FIG. 8 illustrates a portion 86' which has a shorter axial length than the portion 86. As shown, the downstream end of the portion 86' is joined to the downstream portion 88 by means of a downstream convergent frusto-conical portion 92 whereby the air flow is reorganized to obtain the desired axial flow upstream and the pressure loss in the turbulent flow zone is minimized. In addition the portion 86' extends laterally outwardly from the horizontal axis of the shell 80 at a greater angle than the portion 86 previously described whereby a greater turbulence is obtained in the air stream adjacent the inner surface of the portion 86'. The degre of turbulence required will depend upon the mixture being removed from the air stream, however, there is no single or small range of critical angles for the taper of a portion such as portions 86 or 86'. In the embodiment shown in FIG. 7a the portion 86 extends at an angle T of 10 degrees and the corresponding angle T' in FIG. 8 is 25 degrees. It will be realized that such angles are merely representative of suitable expansion angles and do not constitute limited angles.

Figure 9:
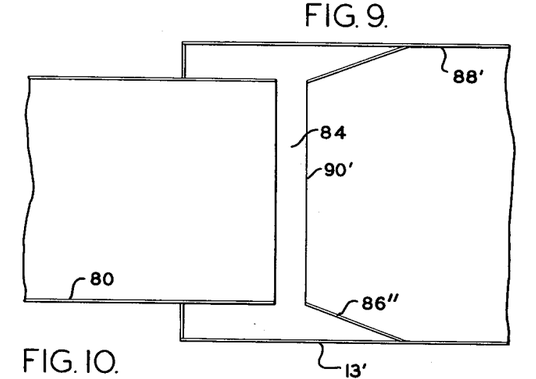

FIG. 9 illustrates another embodiment in which a tapered portion 86'' is provided similar to the portions 86 and 86' previously described. The tapered portion 86'' is provided with a circular mouth 90' at its upstream end which is of the same diameter as the diameter of the upstream shell 80 and the downstream end of the portion 86'' terminates at the upstream end of a portion 88' similar to but of a larger diameter than the portion 88. It will be realized that in the prior embodiments described the mouth 90 is of a smaller diameter than the shell 80 whereby the air stream is necessarily compressed as it flows into the mouth 90. Such compression of the air stream causes a certain turbulence of air flow about the outer surface of the stream which has been employed heretobefore to accomplish the purpose of this invention. The structure of FIG. 9 does not cause compression of the air stream, however, an upstream velocity is created adjacent the inner surface of the portion 86'' in substantially the same manner as heretofore described and accordingly the description thereof need not be repeated.

Figure 11:
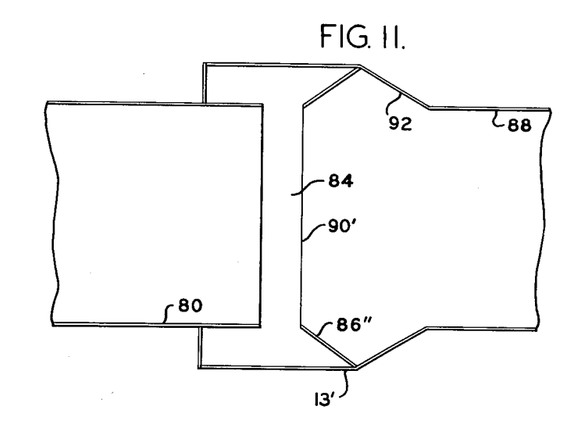

FIG. 11 illustrates a modification combining the tapered portion 86'' with a reorganizing section 92 whereby the larger mouth 90' is utilized with the shells 80 and 82.

Figure 10:
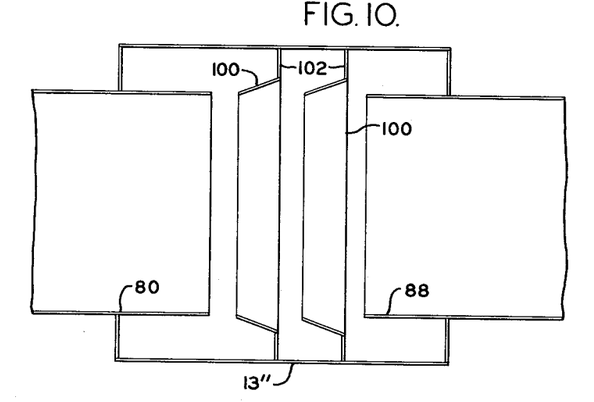

FIG. 10 illustrates a modification comprising a plurality of axially spaced and aligned tapered sections. In this embodiment a chamber 13'' is provided which is larger than the chamber 13' previously described into which the downstream and upstream ends of the shells 80 and 82, respectively, extend. The ends of the shells 80 and 82 are spaced axially a greater distance apart than the embodiments heretofore described and a pair of identical axially aligned, axially spaced tapered sections are located therebetween within the chamber 13″. Each of the tapered sections comprises a hollow frusto-conical shell 100 having an upstream opening of a diameter equal to the diameter of the shells 80 and 82. Each of the sections is suitably rigidly secured within the chamber 13″ by means of an annular flange 102 extending radially between the shell 100 and the inner surface of the chamber 13″. The flanges 102 are suitably secured to the side of the chamber 13″ and the shells 100 to prevent air flow around the inner and outer edges thereof. With such a structure the air stream flow enters the first shell 100 wherein it is expanded to produce an upstream velocity adjacent the inner surface of the upstream shell 100 in the manner as heretofore described. The dust-water mixture is accumulated in the upstream portion of the chamber 13″ in the same manner as previously described. After the air stream flows downstream from the upstream shell 100 its flow is compressed to enter the downstream shell 100 which functions in the same manner as the upstream shell 100 but which discharges its dust-water mixture to the central portion of the shell 100.

Figure 12:
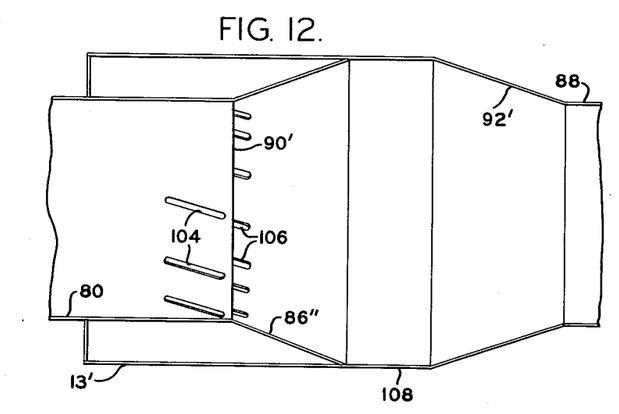

FIG. 12 illustrates another embodiment of this invention which is similar to the construction shown in FIG. 9. The primary novelty of the structure of FIG. 12 resides in the abutting of the mouth 90′ with the downstream end of the shell 80 to eliminate the gap 84 therebetween. Since the gap 84 is eliminated any other suitable means must be provided to permit the dust-water mixture to enter the chamber 13. As shown, a plurality of elongated slots 104 are provided in the shell 80 with the downstream ends thereof being located closely adjacent the downstream end of the shell 80. The slots 104 may be slanted with respect to the horizontal axis of the shell 80 to extend in the same direction in which the air stream swirls. By providing the slots 104 the dust-water mixture on the inner surface of the shell 80 will be free to pass therethrough into the chamber 13′. In a similar manner a plurality of upstream open ended elongated slots 106 are provided in the tapered portion 86″ which extends inwardly from the mouth 90′ thereof whereby the dust-water mixture on the inner surface of the portion 86″ will be free to pass therethrough into the chamber 13′. The slots 104 and 106 may be circumferentially spaced in any suitable manner. As shown the slots 104 are located on the bottom half of the shell 80 while the slots 106 are located completely around the mouth 90′. In addition FIG. 12 illustrates the use of a tubular transition portion 106 between the portion 86″ and a reorganizing section 92′ similar to the section 92 previously described.

From this description it will be noted that an improved separating device has been provided which can readily be fabricated from simple components which normally are secured together to form a stationary structure. From the description, however, it will be seen that it is not essential that all parts be stationary. Thus, for example, the core 12 can readily be supported to centrally float within the air stream to accomplish the same purpose. Obviously, also, the various components of this invention can be rotated intermittently or constantly without affecting the operation of the structure. Of particular importance however is the fact that this invention provides a structure which insures that all the matter to be removed, such as dust laden water, is entrained in the flowing stream and thereafter removed. Of even greater importance is the fact that although dust-water-air fluid flow has been described such fluid is merely representative of the various mixtures which may flow through the separator to obtain separation of the constituents therein. Also, it will be noted that the principles of this invention are particularly adapted for vortical operating separators in which stationary components are particularly desired.

Having described preferred embodiments of our invention in accordance with the Patent Statutes, it is to be realized that modifications thereof may be made without departing from the broad spirit of our invention. Accordingly, it is respectfully requested that our invention be interpreted as broadly as possible and be limited only by the prior art.

We claim:

1. A separating device for removing particles from a particle laden gaseous stream including, an elongated shell member having an inlet spaced longitudinally from an outlet, an elongated core member supported within said shell member intermediate said inlet and said outlet to define an elongated flow path for such a stream between the inner periphery of said shell member and the outer periphery of said elongated core member, said elongated core member having a portion converging towards said outlet at an angle to create an upstream velocity within such stream adjacent said outer periphery when turbulent flow of such a stream occurs through said path, and one of said members having means for collecting particles entrained in such a stream.

2. A separating device for removing particles from a particle laden gaseous stream including, an elongated shell member having an inlet spaced longitudinally from an outlet, an elongated core member supported within said shell member intermediate said inlet and said outlet to define an elongated flow path for such a stream between the inner periphery of said shell member and the outer periphery of said elongated core member, means supported by one of said members for causing turbulent flow of such a stream through said path, said elongated core member having a portion converging towards said outlet at an angle to create an upstream velocity within such stream adjacent said outer periphery when turbulent flow of such a stream occurs through said path, and one of said members having means for collecting particles entrained in such a stream.

3. A separating device for recovering particles from a particle laden gaseous stream including, an elongated shell member having an inlet spaced longitudinally from an outlet, said elongated shell member having a portion diverging downstream with respect to flow of such a stream through said shell member the inner surface of which diverging portion extends at an angle with respect to the longitudinal center of said shell member to create an upstream velocity within such stream adjacent said inner surface when turbulent flow of such a stream occurs through said path, and means for collecting particles entrained in such a stream adjacent the upstream end of said diverging portion.

4. A separating device including, a pair of axially spaced and aligned elongated shells having an inlet spaced longitudinally from an outlet which define a path for the flow of a fluid therethrough which fluid has foreign particles therein, the one of said shells downstream from the other having a portion of a configuration to gradually increase the downstream cross sectional area of said flow path with reference to the cross sectional area of the upstream inlet end thereof, said portion of said one shell diverging at an angle to create an upstream velocity adjacent the inner surface of said portion when turbulent flow of such a fluid occurs through said flow path, and collecting means spaced from and encompassing the axial space between said pair of axially spaced and aligned elongated shells.

5. A method of separating particles entrained in a gaseous stream comprising, moving such a stream through an elongated conduit at a velocity so that turbulent flow occurs, compressing such a stream during said movement by decreasing the cross sectional area of said conduit, expanding such a stream after said compression has occurred and during said movement through an angle to create an upstream velocity with respect to said conduit in a portion of such a stream which includes a boundary portion thereof, and collecting the particles entrained in said portion of such a stream.

6. A method of separating particles entrained in a gaseous stream comprising, moving such a stream longitudinally through an elongated conduit at a velocity to cause turbulent flow, compressing such a stream during said movement by decreasing the cross sectional area of said conduit by means of an elongated core member extending longitudinally within said conduit intermediate the inner surface thereof, expanding such a stream at an angle after said compression has occurred and during said movement to create an upstream velocity with respect to said conduit in a portion of such a stream immediately adjacent the outer surface of said core member while the remaining portion of such a stream continues to move through said conduit to cause the particles immediately adjacent the outer surface of said core member to be entrained in said remaining portion, and collecting the particles entrained in said remaining portion.

7. A separating device including, an elongated shell member having an inlet spaced longitudinally from an outlet, an elongated core member extending axially within a portion of said shell member longitudinally intermediate said inlet and said outlet to define an elongated flow path between the inner periphery of said portion of said shell member and the outer periphery of said core member, said core member having a portion thereof of a form such that the outer surface thereof defines a conical surface converging in an axial direction away from said inlet, said conical surface defining an angle of no less than and substantially fourteen degrees, and one of said members having collecting means.

References Cited by the Examiner
UNITED STATES PATENTS

| | | | |
|---|---|---|---|
| 220,801 | 10/1879 | Byram et al. | 55—396 |
| 791,517 | 6/1905 | Walker | 55—396 |
| 1,548,066 | 8/1925 | Steinbart | 55—456 X |
| 1,735,298 | 11/1929 | Pfeffer | 55—396 X |
| 1,917,643 | 7/1933 | Goldkamp | 55—396 |
| 2,192,214 | 3/1940 | Weir | 55—456 X |
| 2,193,883 | 3/1940 | Reeves | 55—396 X |
| 2,322,414 | 6/1943 | Bowen | 55—396 |
| 2,375,203 | 5/1945 | Appeldoorn | 55—396 X |
| 2,404,347 | 7/1946 | Bieth | 55—338 |
| 2,415,935 | 2/1947 | Bullock | 55—396 X |
| 2,662,610 | 12/1953 | Heinrich | 55—452 X |
| 2,664,966 | 1/1954 | Moore | 55—456 X |
| 2,806,550 | 9/1957 | Westlin | 55—396 |
| 2,847,087 | 8/1958 | Johnson | 55—396 X |

FOREIGN PATENTS

| | | |
|---|---|---|
| 1,058,311 | 11/1953 | France. |
| 1,065,138 | 12/1953 | France. |
| 1,069,071 | 2/1954 | France. |
| 1,106,384 | 7/1955 | France. |
| 745,490 | 10/1944 | Germany. |
| 883,555 | 7/1953 | Germany. |
| 200,380 of 1922 | 7/1923 | Great Britain. |
| 628,212 | 7/1952 | Great Britain. |
| 676,231 | 7/1952 | Great Britain. |
| 711,304 | 6/1954 | Great Britain. |

OTHER REFERENCES

Barrett, A. L.: "Aero-Mechanics," Coal Age, vol. 40, November 1935, pages 447–449.

Vennard, John K.: Elementary Fluid Mechanics, Second Edition, John Wiley and Sons, Inc., New York, New York, 1947, pages 138–140 and 174–176.

Binder, R. C.: Fluid Mechanics, Second Edition, Prentice-Hall, Inc., New York, New York, 1949, pages 104–107 and 187–189.

HARRY B. THORNTON, *Primary Examiner.*

REUBEN FRIEDMAN, *Examiner.*

D. E. TALBERT, JR., *Assistant Examiner.*